UNITED STATES PATENT OFFICE.

ALFRED A. WELLS, OF MONTCLAIR, NEW JERSEY.

DISINFECTANT, &c.

14,562. Specification of Reissued Letters Patent. Reissued Dec. 10, 1918.

No Drawing. Original No. 1,280,602, dated October 1, 1918, Serial No. 201,457, filed November 12, 1917. Application for reissue filed November 7, 1918. Serial No. 261,573.

*To all whom it may concern:*

Be it known that I, ALFRED A. WELLS, a citizen of the United States, and a resident of Montclair, in the county of Essex and State of New Jersey, have invented certain new and useful Improvements in Disinfectants, &c., of which the following is a specification.

The present invention is a composite liquid material or paste which has a number of uses, for example, as a disinfectant or insecticide on the one hand, and on the other hand, in an entirely different art, namely: as a paint and varnish remover.

My invention has as a basis a chlorinated hydrocarbon and a phenol in the preferred form. The chlorinated hydrocarbon is preferably one of the aromatic series and is preferably monochlor benzol or at least one of the lower chlor benzols, chlor toluols, chlorinated solvent naphtha, and the like. Monochlor benzol is satisfactory for the purpose and may be used as the vehicle or basis to carry the other materials.

The disinfecting composition may be improved by the addition of higher chlorinated hydrocarbons, such as the fixed chlor compounds, including di or trichlor benzol and the like. Carbolic acid or phenol may be used, especially in amount considerably less than the amount of chlor benzol employed, when the latter is used as the vehicle. I prefer to employ the carbolic acid in an amount equal to materially less than the amount of the chlor benzol used, in practice an amount of carbolic acid equal to about one-third to one-fourth of the amount of the chlor benzol in the mixture, and sometimes it is advisable to still further reduce the amount of the phenol, in which event the proportion may be one-sixth or one-eighth as much carbolic acid or phenol as chlor benzol.

In the present invention it is the object to produce a composition which is not dangerously inflammable like gasolene and other solvent liquids which have been used in disinfecting and insecticidal compositions and the chlorinated aromatic hydrocarbons serve very satisfactorily to this end, as their flash point is relatively high. Taking chlor benzol, for example, it will be noted that when free from benzol, it is fairly difficult to ignite on bringing the mass into contact with a layer of the chlor benzol spread out, for example, on a glass plate. However, the flash point is somewhat low for certain purposes and I may add to the composition a small amount of carbon tetrachlorid or equivalent aliphatic hydrocarbon, such as dichlor ethylene, chlorinated acetylene and similar chlorinated compound, trichlor ethylene being suited for the purpose. Carbon tetrachlorid is somewhat cheaper and more readily available than a number of the other solvents mentioned and I prefer to use it, especially in anhydrous compositions where water is not present to bring about decomposition of the tetrachlorid.

To retard the evaporation of the disinfectant, I may use waxy material and for this purpose, I have found that a special form of wax is of importance. Chlor benzol and carbon tetrachlorid will dissolve relatively large amounts of wax, such for example, as ordinary soft paraffin, Japan wax, and the like, thus clogging the solution with excessive amounts of waxy material and adding bulk. I have observed that if wax, for example, paraffin wax is dissolved in a solvent such as benzol and alcohol added to partially precipitate the wax, a product is obtained which is relatively insoluble in the chlor benzol, so that only a relatively small amount is needed. While 10% or 15% or more of soft paraffin wax may be required, I may use only 3% or 4% of the paraffin wax obtained by precipitation in this way. For example, wax melting at 127° F. was treated in this manner, yielding on fractional precipitation a wax melting at 131° F. and 4% of the latter wax sufficed to give a solution evaporating very slowly, due to the formation on the surface of a film of wax which sealed the hydrocarbon in place. In this way the disinfecting material is maintained at the point where it is to be used without evaporation and acts in an efficient manner, while as an insectifuge it has very desirable properties because of the ability of solvents of so penetrating a character as chlor benzol to be maintained under conditions where they do not readily evaporate.

A composition which will serve to illustrate the present invention is prepared by making a stock solution of 1400 c. c. chlor benzol, 320 grams phenol crystals and 200 c. c. of carbon tetrachlorid. To 1 liter of the above composition 45 grams of precipitated paraffin wax was added and the solution shaken until the wax was incorporated, this being facilitated by warming slightly. A slowly evaporating composition suitable as a disinfecting solution and having satisfactory softening or dissolving action on dried films of paint or varnish was obtained.

The composition may be variously modified by the use of other solvents than that illustratively indicated. In some cases the addition of a small amount of dry soap is desirable, especially for disinfecting compositions which are intended to be used in the form of emulsions.

Instead of phenol, cresol or other equivalent phenolic bodies may be used. The amount of carbon tetrachlorid employed may be varied, but usually only a small proportion, say, 10% or so, is needed to raise the flash point above that at which the composition on a flat surface may be ignited by flame in too ready a manner, except by superheating to well above ordinary atmospheric temperatures.

The proportion of wax employed in the present composition preferably does not exceed 7% or 8%, and in the preferred form it does not exceed 5%. The use of a wax solvent, such as chlor benzol with waxy material in such relatively small amount, yet capable of forming a film on exposure which retards evaporation, constitutes one of the useful features of my invention.

Beside paraffin wax, ceresin wax may be used in like manner. It may be similarly treated by dissolving the ceresin and precipitating with a suitable precipitating agent, or by dissolving the wax in a solvent while warm and cooling the wax so as to secure precipitated wax useful in the present composition. In like manner, Montan wax, beeswax and other waxes may be employed.

What I claim is:—

1. A composition of matter in the proportion of approximately 1400 c. c. chlor benzol, 320 grams phenol crystals and 200 c. c. carbon tetrachlorid with a small amount of precipitated paraffin wax.

2. A composition of matter which comprises a large proportion of chlor benzol and a smaller proportion each, of a phenol and carbon tetrachlorid, all incorporated with a small proportion of wax acting as a retardant of evaporation.

3. A composition of matter adapted for use as a disinfecting composition and containing volatile solvents which comprises a large proportion of a liquid chlorinated hydrocarbon of the benzol type and a smaller proportion each of a phenol and a noninflammable chlorinated compound of the aliphatic series, incorporated with a retardant of evaporation comprising waxy material in an amount sufficient to substantially retard evaporation of said volatile solvents.

4. A composition of matter adapted for use as a disinfectant and containing volatile solvents whose evaporation is retarded, thereby enabling them to exert a local action, which composition comprises as its largest ingredient, a liquid chlorinated hydrocarbon material incorporated with a substantially smaller proportion of a phenolic body and not over about 8% of a waxy material, the latter serving to retard evaporation; said composition not being readily ignitible when spread out on a flat surface and a flame dropped into contact with the surface of said composition.

5. A composition of matter adapted to be used as a disinfectant having as its largest constituent, a mixture of liquid chlorinated aromatic hydrocarbon and a liquid chlorinated aliphatic hydrocarbon, and in addition thereto smaller quantities of a phenol, such material being incorporated with an amount of waxy material sufficient to retard evaporation.

6. A composition of matter in the proportion of approximately 1400 c. c. chlorbenzol, 200 c. c. carbon tetrachlorid and a small amount of precipitated paraffin wax.

7. A composition of matter which comprises a large proportion of chlorbenzol and a smaller proportion of carbon tetrachlorid incorporated with a small proportion of wax acting as a retardant of evaporation.

ALFRED A. WELLS.